United States Patent
Gordon et al.

(10) Patent No.: US 7,234,711 B2
(45) Date of Patent: Jun. 26, 2007

(54) STROLLER TIP PREVENTION

(76) Inventors: Stuart Gordon, 104 Red Rambler Rd., Layfayette Hills, PA (US) 19444; Scott Gordon, 104 Red Rambler Rd., Lafayette Hills, PA (US) 19444

( * ) Notice: Subject to any disclaimer, the term of this patent is extended or adjusted under 35 U.S.C. 154(b) by 335 days.

(21) Appl. No.: 10/968,755

(22) Filed: Oct. 19, 2004

(65) Prior Publication Data
US 2005/0082792 A1  Apr. 21, 2005

Related U.S. Application Data

(60) Provisional application No. 60/512,521, filed on Oct. 20, 2003.

(51) Int. Cl.
*B62B 7/00* (2006.01)
(52) U.S. Cl. .................. 280/47.38; 280/642; 280/647; 280/658; 280/755
(58) Field of Classification Search .................. 280/29, 280/43.14, 47.2, 47.34, 47.38, 293, 303, 280/642, 647, 658, 755
See application file for complete search history.

(56) References Cited

U.S. PATENT DOCUMENTS

| | | | | |
|---|---|---|---|---|
| 2,857,953 A * | 10/1958 | Berger et al. | ............ | 280/47.35 |
| 5,121,940 A * | 6/1992 | March | ........................ | 280/644 |
| 5,560,627 A * | 10/1996 | Zatulovsky et al. | .......... | 280/42 |
| 6,378,890 B1 * | 4/2002 | Cheng | ........................ | 280/642 |
| 6,474,664 B1 | 11/2002 | Luttway et al. | | |

* cited by examiner

*Primary Examiner*—Lesley D. Morris
*Assistant Examiner*—Katy Meyer
(74) *Attorney, Agent, or Firm*—Paul Maleson

(57) ABSTRACT

For baby strollers, particularly umbrella strollers, a device to prevent tipping comprising a pair of rearward extension bars. Each bar is adapted to extend rearwardly over or nearly over one of the rear wheels of the stroller. Each curves downwards so as to clear the wheel over or near which it extends and then curves to present a distal end section at least approximately parallel to the surface on which the stroller sits. Each bar is provided with a clamp by which it may be attached to the stroller. The clamp is adjustable to optimize tip prevention and loosenable so that the extension may be folded transversely for storage or transport.

5 Claims, 2 Drawing Sheets

STROLLER TIP PREVENTION

RELATED APPLICATION

This application is based on and claims priority under U.S. Provisional Application 60/512,521, filed Oct. 20, 2003.

BACKGROUND OF THE INVENTION

1. Field of the Invention

This invention relates to baby strollers, particularly to collapsible strollers popularly known as umbrella strollers. It relates to a modified form of such strollers and also to an attachment adapted to be added as an aftermarket accessory to an existing umbrella stroller.

Adults using strollers often wish or need to hang handbags, shopping bags and the like on the handles of the stroller. The infant seated in the stroller provides a degree of counterweight opposed to the torque of the bag hung on the handles. However, there is a tendency for this counterweight to be overcome and the stroller tip over backwards. It is desirable to avoid such tipping which may be dangerous to the infant and in any event is disruptive to the adult's use.

Relatively complicated and expensive extension members have been contemplated to prevent tipping, as has the addition of weights toward the front of the stroller. The present invention contemplates a simpler, more economical and reliable system for preventing backward tipping.

2. Prior Art

Prior expedients include U.S. Pat. No. 6,474,664 which provides for a relatively complex device intended to prevent tipping of strollers. That expedient involves a member which is both folding and telescoping. The present invention provides tip protection with a simpler and less costly attachment. Wheelchairs have also been provided with means intended to prevent tipping backwards.

It is an object of this invention to provide a tip-resistant umbrella stroller.

It is another object of this invention to provide an attachment that may be installed by the user on an existing stroller to make it tip-resistant.

It is another object of this invention to provide a pair of simple unitary curved rearward extensions adapted to be folded out of the way when the stroller is folded up.

SUMMARY OF THE INVENTION

The invention comprises a pair of rearward extensions. Each of the pair is intended to extend rearwardly over or nearly over one of the rear wheels of the stroller. It is understood that an umbrella stroller has four wheels, two in the front and two in the back. Some or all of these wheels may be provided as double wheels so that the stroller really has eight wheels.

Each of the pair of extensions generally comprises a simple one-piece rounded plastic bar with a curve downwards so as to clear the wheel over or near which it extends and then curving in the opposite direction so as to present a distal end section at least approximately parallel to the pavement or other surface on which the stroller sits.

Each of the pair of extensions is provided with a clamp at its proximal end by which it may be attached to an approximately vertical element of the stroller. The clamp is adjustable to optimize the tip prevention and loosenable so that the extension may be folded in transversely when the stroller is to be folded up for storage or transport.

DETAILED DESCRIPTION OF THE PREFERRED EMBODIMENT

Figure 1:
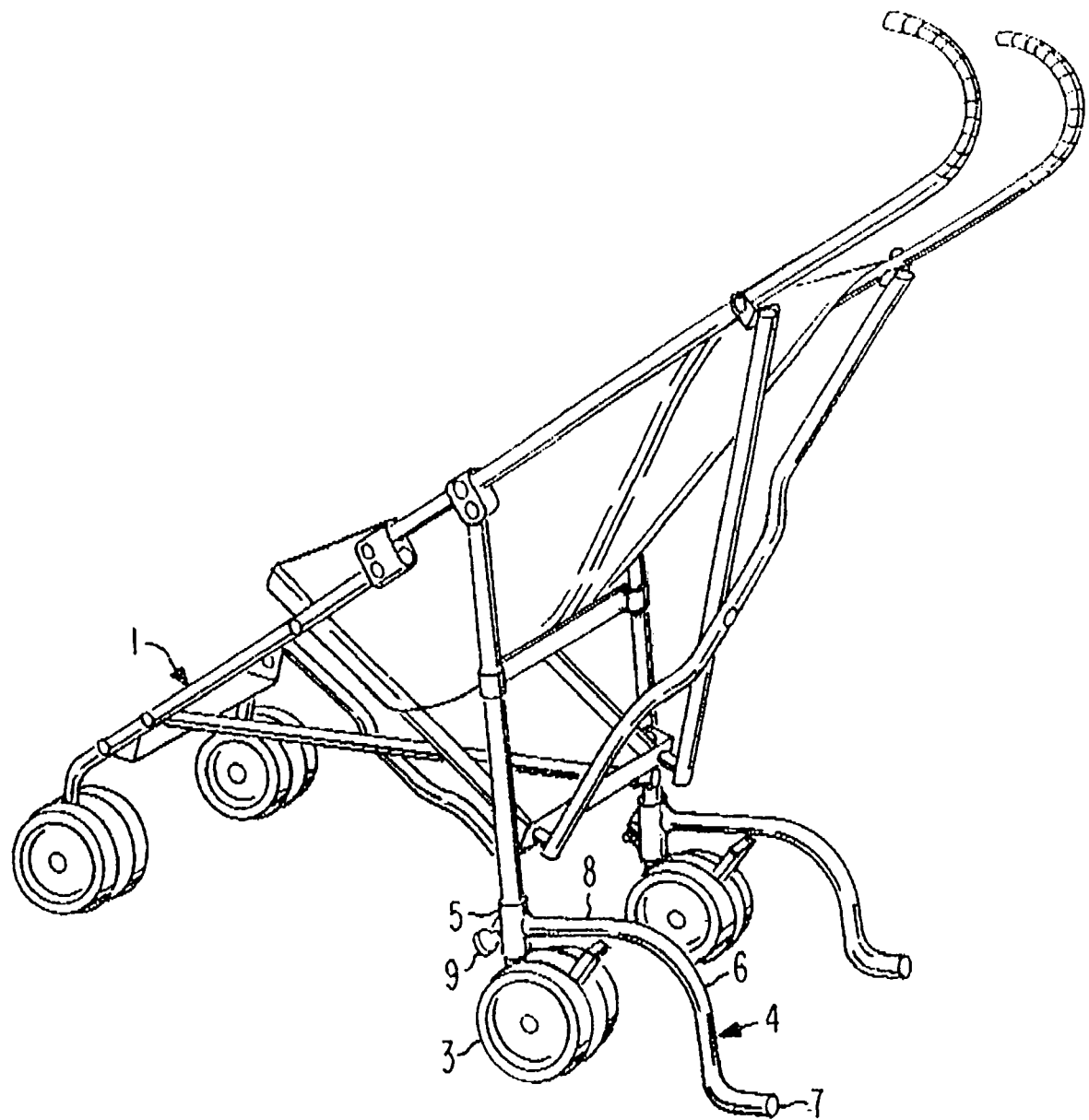
FIG. 1 is a perspective view of an umbrella stroller in operating unfolded mode with a pair of rearward extensions in operating unfolded tip-prevention mode.

The invention is best understood initially in connection with FIG. 1. A conventional lightweight foldable umbrella stroller is generally designated 1. An anti-tip extension generally designated 4 is provided. as can be seen from the drawing, an identical pair of anti-tip extensions are provided. Only one of the extensions is numbered and described, it being understood that the other of the pair is identical in structure.

The extension generally designated 4 has a proximal straight section 8, generally approximately horizontal. It has a middle section 6 smoothly curved downwardly. It has a distal end 7 which is relatively short and is straight and approximately horizontal.

At the proximal end of the extension 6 a clamp 5 is provided. The clamp 5 is configured to fit around an approximately vertical element of the stroller 1, which vertical element terminates at its lower end at the axle for the rear wheel 3. In the embodiment shown, the rear wheel 3 is a double wheel and the vertical element terminates at the axle between the twin wheels.

The clamp 5 is openable and is flexible enough so that it may be opened and fitted around the vertical element of stroller 1. A thumbscrew 9 is provided so that the clamp may be loosened or tightened. In the operating mode shown in FIG. 1, the thumbscrew 9 is tightened and the clamp is thus firmly around the vertical element of stroller 1 and the anti-tip extension is extended approximately directly rearwardly from the stroller and is positioned over or nearly over a rear wheel. In the embodiment shown, since each wheel is a twin wheel, the extension 4 is positioned between each wheel of the twin wheels. In this patent, a twin wheel may be described as a wheel.

It is apparent that when the stroller is being pushed in the normal manner, the distal end 7 of the extension 4 clears the pavement. When, for any reason, the stroller tends to tip backwards, the end 7 of extension 4 will contact the pavement and prevent the tipping from occurring.

An important aspect of the invention is the provision of a pair of the extensions 6, each of the pair being positioned over or nearly over one of the rear wheels. In the embodiment shown, each of the rear wheels is a twin wheel and each of the pair of extensions 6 is positioned between the wheels of the twin.

Figure 2:
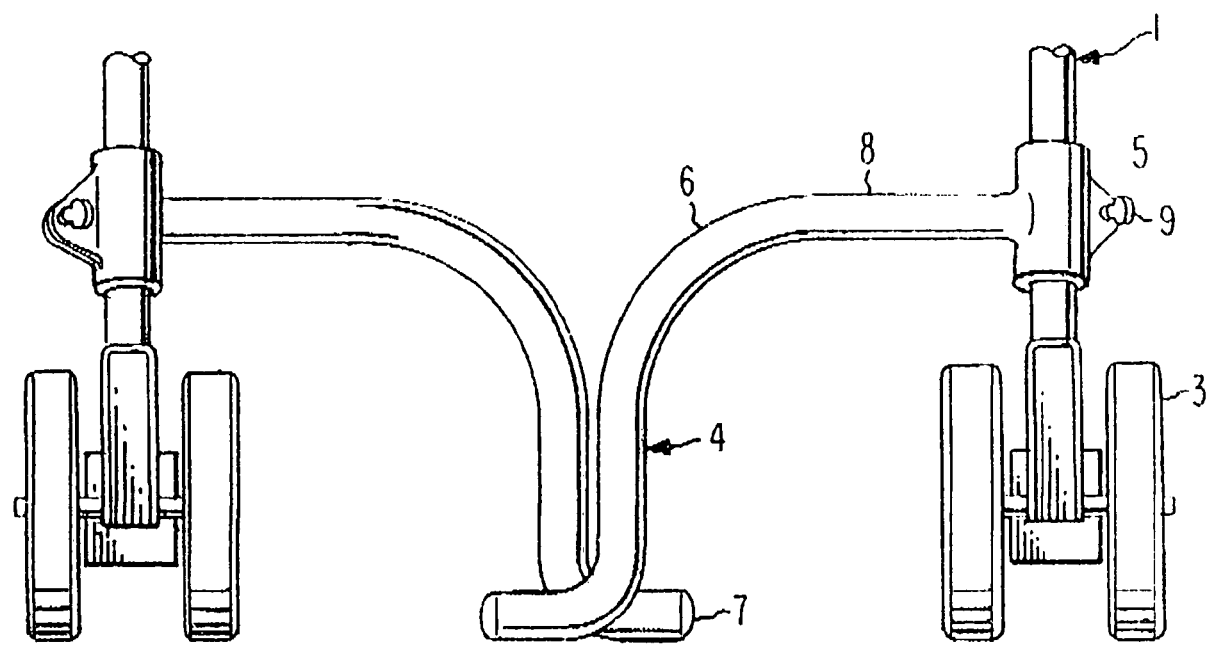
FIG. 2 is a rear elevation view of the pair of extensions in transversely folded-in non-operating mode for storage or transport with part of the stroller shown fragmented.

In FIG. 2, the invention is shown with the extensions 6 each being folded inwardly and transversely so as to conform with the general shape of the folded umbrella stroller 1. From the figure, it is seen that one of the extensions 4 is folded overlapping the other of the pair. It is apparent that the thumbscrew 9 may be loosened if necessary so that the extension 8 may be swung inwardly for storage or transport.

We claim:

1. The combination of an umbrella type stroller having at least four wheels including two rear wheels and a vertical element substantially above each said rear wheel; and a pair of identical tip prevention bars, each said bar comprising:

a proximal end adapted to be attached to said stroller and a distal end;

a proximal end straight section, generally approximately horizontal;

a middle section smoothly curved downwardly;

a distal end straight section shorter than either said proximal section or said middle section, and being approximately horizontal;

said proximal end of each said bar being provided with a clamp configured to loosenably attach to a said vertical element on said stroller, whereby each said bar may be selectively extended rearwardly of said stroller to prevent tipping or folded transversely said stroller for storage or transport.

2. The combination of stroller and tip prevention bars as set forth in claim 1, wherein each of said rear wheels is a twin wheel connected by an axle and each said vertical element extends upward from said axle.

3. The combination of stroller and tip prevention bars as set forth in claim 2 wherein said clamp on each said bar is openable and provided with a thumbscrew, to permit said bar being secured either rearwardly for tip prevention or transversely for storage or transport.

4. The combination of stroller and tip prevention bars as set forth in claim 3, wherein said middle section of each said bar is configured to clear the top of said rear stroller wheels.

5. The combination of stroller and tip prevention bars as set forth in claim 4, wherein each of said bars is of rounded cross-sectional contour.

* * * * *